US008917456B2

(12) United States Patent
Ori

(10) Patent No.: US 8,917,456 B2
(45) Date of Patent: Dec. 23, 2014

(54) MEDIUM TELEPHOTO LENS AND IMAGING DEVICE

(71) Applicant: FUJIFILM Corporation, Tokyo (JP)

(72) Inventor: Tetsuya Ori, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/274,005

(22) Filed: May 9, 2014

(65) Prior Publication Data

US 2014/0247506 A1  Sep. 4, 2014

Related U.S. Application Data

(63) Continuation of application No. PCT/JP2012/007239, filed on Nov. 12, 2012.

(30) Foreign Application Priority Data

Nov. 14, 2011 (JP) .................................. 2011-248180

(51) Int. Cl.
  *G02B 15/14* (2006.01)
  *G02B 3/02* (2006.01)
(52) U.S. Cl.
  USPC ........... 359/683; 359/717; 359/745; 359/748; 359/793; 359/794
(58) Field of Classification Search
  USPC .................. 359/683, 717, 745, 748, 793, 794
  See application file for complete search history.

(56) References Cited

U.S. PATENT DOCUMENTS

| 4,556,295 | A | * | 12/1985 | Okudaira | 359/745 |
| 4,852,984 | A | * | 8/1989 | Takahashi et al. | 359/748 |
| 5,627,685 | A | * | 5/1997 | Yamanashi | 359/745 |
| 5,640,277 | A | * | 6/1997 | Ohshita | 359/792 |
| 5,717,527 | A | * | 2/1998 | Shibayama | 359/690 |
| 6,317,275 | B1 | * | 11/2001 | Yoneyama | 359/748 |

(Continued)

FOREIGN PATENT DOCUMENTS

| JP | 02-081015 | 3/1990 |
| JP | 2002-139668 | 5/2002 |
| JP | 2004-212692 | 7/2004 |
| JP | 2011-253050 | 12/2011 |

OTHER PUBLICATIONS

Japanese Office Action dated Jul. 15, 2014 in corresponding Japanese Patent Application No. 2013-544121, with partial English translation.
International Search Report, PCT/JP2012/007239, Mar. 26, 2013.

*Primary Examiner* — Evelyn A. Lester
(74) *Attorney, Agent, or Firm* — Young & Thompson

(57) ABSTRACT

A first lens group having positive refractive power and a second lens group are arranged in this order from an object side, and only the first lens group moves in the optical axis direction while focusing. The first lens group substantially consists of a positive 1-1 lens, a positive 1-2 lens, a positive 1-3 lens, a negative 1-4 lens, an aperture stop, a negative 1-5 lens, a positive 1-6 lens, and a positive 1-7 lens. The 1-3 lens and the 1-4 lens are cemented to each other, and the 1-5 lens and the 1-6 lens are cemented to each other. The second lens group substantially consists of a negative 2-1 lens and a positive 2-2 lens. Only the first lens group moves in the optical axis direction while focusing.

14 Claims, 16 Drawing Sheets

(56) References Cited

U.S. PATENT DOCUMENTS

| | | |
|---|---|---|
| 6,549,343 B2 | 4/2003 | Yoneyama |
| 2002/0048092 A1 | 4/2002 | Yoneyama |
| 2009/0273851 A1 * | 11/2009 | Take et al. .................. 359/755 |
| 2011/0299179 A1 | 12/2011 | Maetaki |

* cited by examiner

FIG.1
A INFINITY
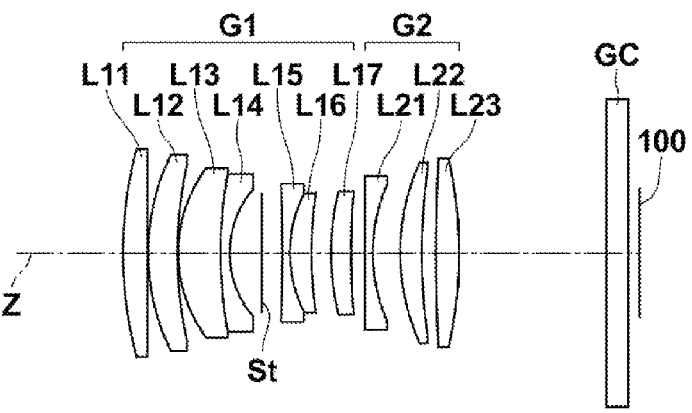
B MAGNIFICATION -0.2X
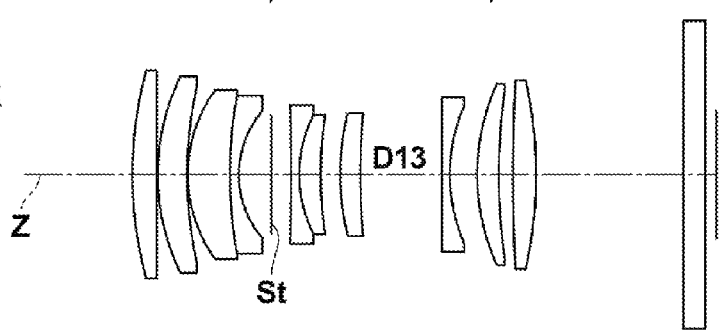
C MAGNIFICATION -0.5X
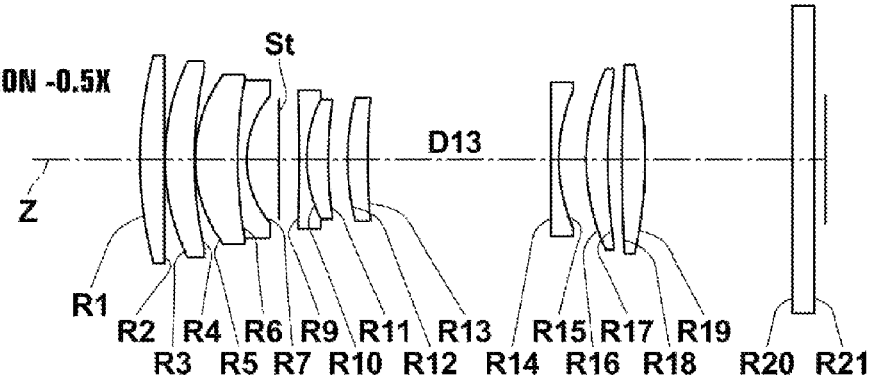

FIG.2
EXAMPLE 2
A INFINITY
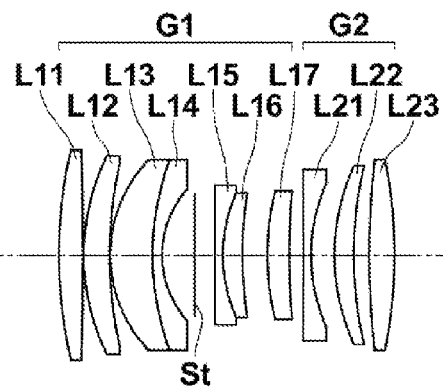
B MAGNIFICATION -0.2X
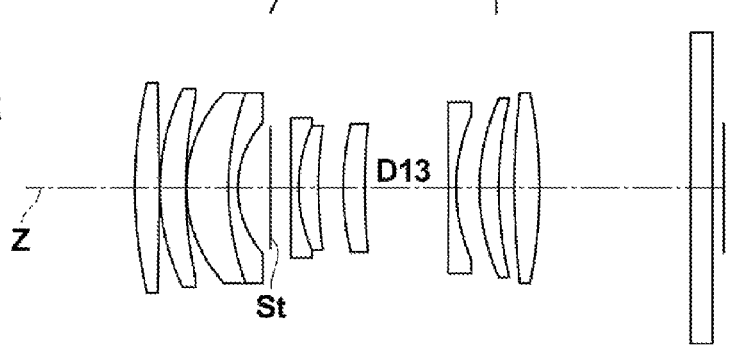
C MAGNIFICATION -0.5X
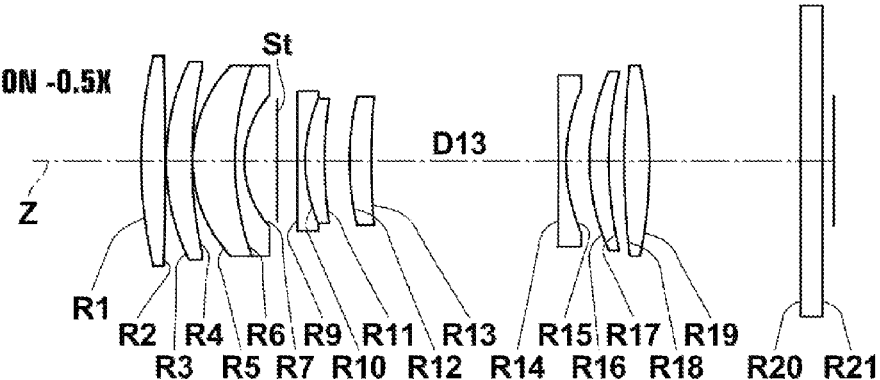

FIG.3
A INFINITY
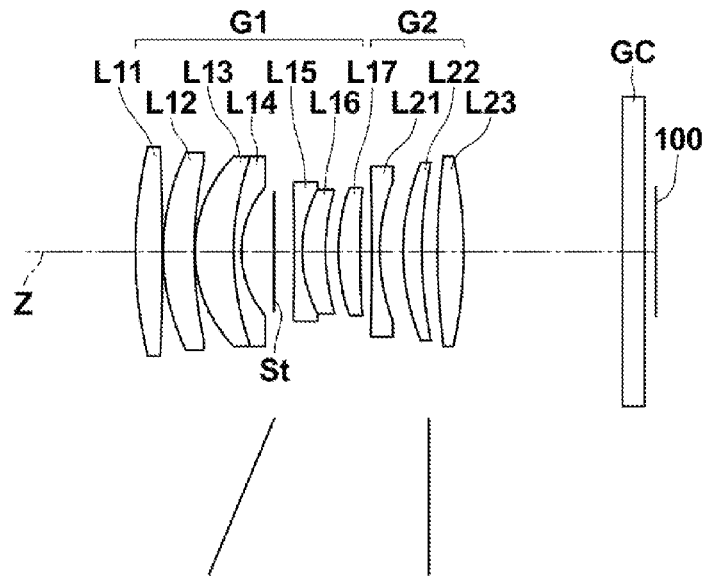
B MAGNIFICATION -0.2X
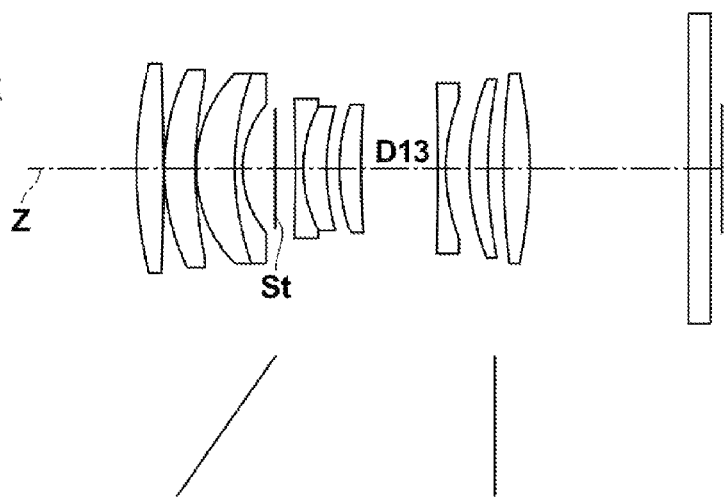
C MAGNIFICATION -0.5X
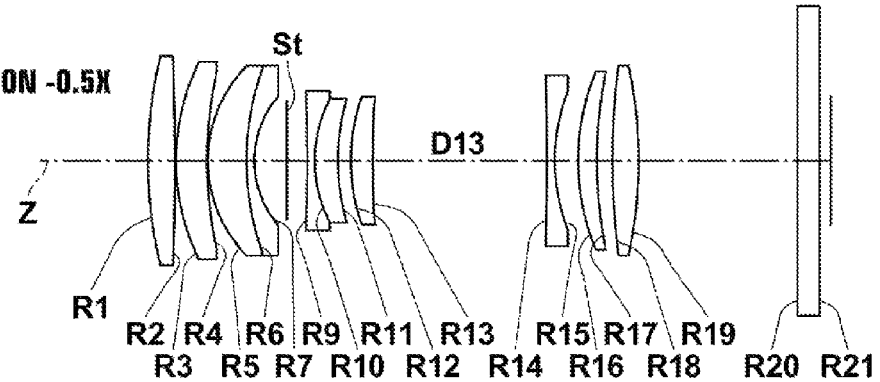

FIG.19
EXAMPLE 5
INFINITY
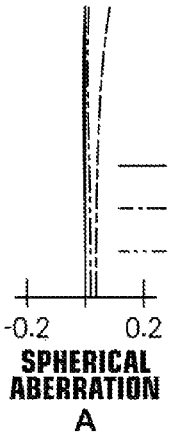
FNO. = 2.48
—— 587.6nm
--- 460nm
····· 615nm
-0.2  0.2
SPHERICAL ABERRATION
A
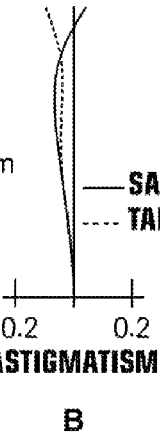
ω = 13.4°
—— SAGITTAL
--- TANGENTIAL
-0.2  0.2
ASTIGMATISM
B
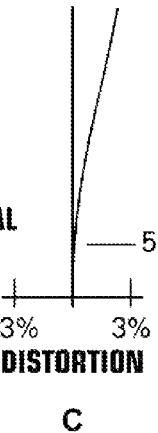
ω = 13.4°
—— 587.6nm
-3%  3%
DISTORTION
C
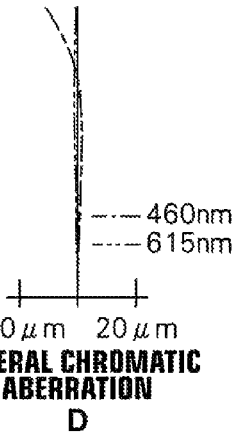
ω = 13.4°
--- 460nm
····· 615nm
-20μm  20μm
LATERAL CHROMATIC ABERRATION
D
FIG.20
EXAMPLE 5
MAGNIFICATION -0.2X
FNO. = 3.06
—— 587.6nm
--- 460nm
····· 615nm
-0.2  0.2
SPHERICAL ABERRATION
A
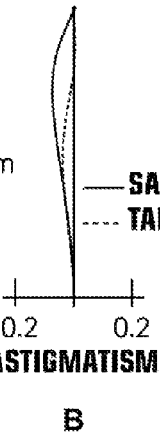
ω = 10.7°
—— SAGITTAL
--- TANGENTIAL
-0.2  0.2
ASTIGMATISM
B
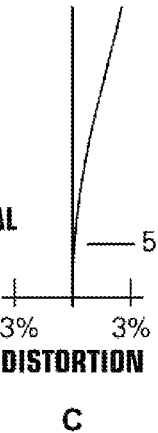
ω = 10.7°
—— 587.6nm
-3%  3%
DISTORTION
C
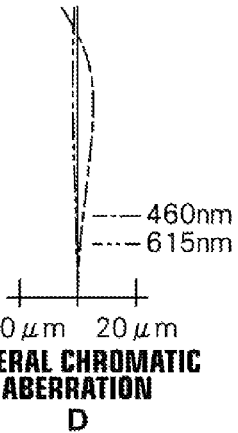
ω = 10.7°
--- 460nm
····· 615nm
-20μm  20μm
LATERAL CHROMATIC ABERRATION
D

MEDIUM TELEPHOTO LENS AND IMAGING DEVICE

BACKGROUND OF THE INVENTION

1. Field of the Invention

The present invention relates to a medium telephoto lens suitable for imaging devices, such as a single-lens reflex camera and the like, and particularly relates to a medium telephoto lens suitable for short-distance photography and to an imaging device including this medium telephoto lens.

2. Description of the Related Art

Medium telephoto lenses of this type, which substantially consist of a first lens group and a second lens group in this order from the object side and in which both the first lens group and the second lens group are moved while focusing, are conventionally known, as disclosed in Japanese Unexamined Patent Publication No. 2 (1990)-081015 and Japanese Unexamined Patent Publication No. 2004-212692. However, the medium telephoto lenses disclosed in Japanese Unexamined Patent Publication No. 2 (1990)-081015 and Japanese Unexamined Patent Publication No. 2004-212692 adopt floating mechanisms that move both the first lens group and the second lens group, which makes mechanisms for moving lenses complicated and causes an increase in the size and cost of the lenses.

As disclosed in Japanese Unexamined Patent Publication No. 2002-139668, medium telephoto lenses, in which only the first lens group is configured to move while focusing, are known. The medium telephoto lens disclosed in Japanese Unexamined Patent Publication No. 2002-139668 substantially consists of a first lens group having positive refractive power as a whole and a second lens group having positive refractive power as a whole in this order from the object side. In the medium telephoto lens, the first lens group substantially consists of a positive 1-1 lens having stronger positive power on the object side surface, a 1-2 lens which is a positive meniscus lens having positive power on the object side surface, a 1-3 lens which is a negative meniscus lens with a concave surface toward the image side, an aperture stop, a cemented lens formed by cementing a negative 1-4 lens with a concave surface toward the object side and a positive 1-5 lens, and a positive 1-6 lens in this order from the object side. The second lens group substantially consists of a 2-1 lens, which is a negative meniscus lens with a convex surface toward the object side, and a positive 2-2 lens in this order from the object side. Only the first lens group moves in the direction of the optical axis while focusing.

SUMMARY OF THE INVENTION

However, the 1-3 lens is a single lens in the medium telephoto lens disclosed in Japanese Unexamined Patent Publication No. 2002-139668, thereby making it difficult to correct longitudinal chromatic aberration. Moreover, the combined focal length of the first lens group is long and the combined focal length of the 1-1 lens through the 1-3 lens is long, so that the total optical length will be long, thereby making it difficult to achieve miniaturization of the lens. Further, in the cemented lens constituted by the 1-4 lens and the 1-5 lens, the difference in the Abbe numbers is small, thereby making it difficult to correct longitudinal chromatic aberration and lateral chromatic aberration.

The present invention has been developed in view of the above circumstances. It is an object of the present invention to provide a medium telephoto lens and an imaging device including the medium telephoto lens which exhibit little chromatic aberration; have a reduced size and increased performance; and involve reduced costs.

The medium telephoto lens according to the present invention substantially consists of a first lens group having positive refractive power and a second lens group in this order from an object side, wherein the first lens group substantially consists of a positive 1-1 lens with a convex surface toward the object side, a positive 1-2 lens with a convex surface toward the object side, a positive 1-3 lens with a convex surface toward the object side; a negative 1-4 lens with a concave surface toward an image side; an aperture stop, a negative 1-5 lens with a concave surface toward the image side, a positive 1-6 lens with a convex surface toward the object side, and a positive 1-7 lens with a convex surface toward the object side, in this order from the object side;

the 1-3 lens and the 1-4 lens are cemented to each other and the 1-5 lens and the 1-6 lens are cemented to each other;

the second lens group substantially consists of a negative 2-1 lens with a concave surface toward the image side and a positive 2-2 lens with a convex surface toward the object side; and only the first lens group moves in the optical axis direction while focusing.

The medium telephoto lens of the present invention substantially consists of a first lens group and a second lens group, and may include lenses substantially without any refractive power; optical elements other than lenses such as aperture stops, glass covers, and the like; and mechanical components such as lens flanges, lens barrels, imaging elements, and camera shake correction mechanisms; in addition to the two lens groups.

In the present invention, surface shapes of lenses, such as a convex surface, a concave surface, a planar surface, biconcave, meniscus, biconvex, plano-convex, plano-concave, and the like; and signs of the refractive powers of lenses, such as positive and negative, should be considered in a paraxial region if aspheric surfaces are included therein, unless otherwise noted. Moreover, in the present invention, the sign of the radius of curvature is positive in the case that a surface shape is convex on the object side, and negative in the case that the surface shape is convex on the image side.

In the medium telephoto lens of the present invention, it is preferable for the second lens group to substantially consist of a negative 2-1 lens with a concave surface toward the image side, a positive 2-2 lens with a convex surface toward the object side, and a positive 2-3 lens with a convex surface toward the image side, in this order from the object side.

Further, in the medium telephoto lens of the present invention, it is preferable for the 1-7 lens to be an aspheric surface lens in which at least one surface is constituted by an aspheric surface.

In the medium telephoto lens of the present invention as described above, it is preferable for conditional expressions (1) through (5) below to be satisfied. Preferably, the medium telephoto lens may have a configuration, in which any one of conditional expressions (1) through (5) below is satisfied, or may have a configuration in which an arbitrary combination of two or more of the conditional expressions are satisfied.

$$1.0 < fi/f1 < 1.3 \quad (1)$$

$$0.80 < fi/f1a < 1.5 \quad (2)$$

$$-0.4 < fi/f1b < 0.4 \quad (3)$$

$$20.0 < vd6 - vd5 < 70.0 \quad (4), \text{ and}$$

$$10 < vd3 - vd4 < 30 \quad (5), \text{ where}$$

fi: the focal length of the entire system while photographing an object at a distance of infinity, f1: the combined focal length of the first lens group, f1a: the combined focal length of the 1-1 lens through the 1-4 lens,
f1b: the combined focal length of the 1-5 lens through the 1-7 lens,
vd5: the Abbe number with respect to the d-line of the 1-5 lens,
vd6: the Abbe number with respect to the d-line of the 1-6 lens,
vd3: the Abbe number with respect to the d-line of the 1-3 lens, and
vd4: the Abbe number with respect to the d-line of the 1-4 lens.

Note that conditional expressions (1-1), (1-2), (1-3), (2-1), (3-1), (4-1), and (5-1) below may be satisfied:

$$1.05 < fi/f1 < 1.25 \tag{1-1}$$

$$1.08 < fi/f1 < 1.25 \tag{1-2}$$

$$1.11 < fi/f1 < 1.25 \tag{1-3}$$

$$1.0 < fi/f1a < 1.3 \tag{2-1}$$

$$-0.3 < fi/f1b < 0.3 \tag{3-1}$$

$$25.0 < vd6 - vd5 < 60.0 \tag{4-1}$$

$$16 < vd3 - vd4 < 30 \tag{5-1}$$

The imaging device of the present invention includes the medium telephoto lens of the present invention described above.

According to the medium telephoto lens of the present invention, the 1-3 lens and the 1-4 lens, which constitute the first lens group, are cemented to each other, and only the first lens group moves in the optical axis direction while focusing, thereby achieving a good resolution with little change from infinity to the short distance as well as attaining miniaturization of lenses and simplification of focus mechanisms. Thereby, a medium telephoto lens with high performance is realized.

The imaging device of the present invention includes the medium telephoto lens of the present invention, which enables configuration of the device in a small size and low cost and obtainment of favorable images having high resolution using an imaging element.

BRIEF DESCRIPTION OF THE DRAWINGS

FIG. 1 is a cross-sectional view illustrating a first configuration of a medium telephoto lens according to one embodiment of the present invention, corresponding to a lens according to Numerical Example 1.

FIG. 2 is a cross-sectional view illustrating a second configuration of the medium telephoto lens, corresponding to a lens according to Numerical Example 2.

FIG. 3 is a cross-sectional view illustrating a third configuration of the medium telephoto lens, corresponding to a lens according to Numerical Example 3.

FIG. 19 is a diagram illustrating various aberrations of a medium telephoto lens according to Example 5, which is in a state focused on infinity, showing A as spherical aberration, B as astigmatism, C as distortion, and D as lateral chromatic aberration.

FIG. 20 is a diagram illustrating various aberrations of the medium telephoto lens according to Example 5, which is in a state of focus with a photographing magnification of −0.2×, showing A as spherical aberration, B as astigmatism, C as distortion, and D as lateral chromatic aberration.

LENS CONFIGURATION

Figure 6:
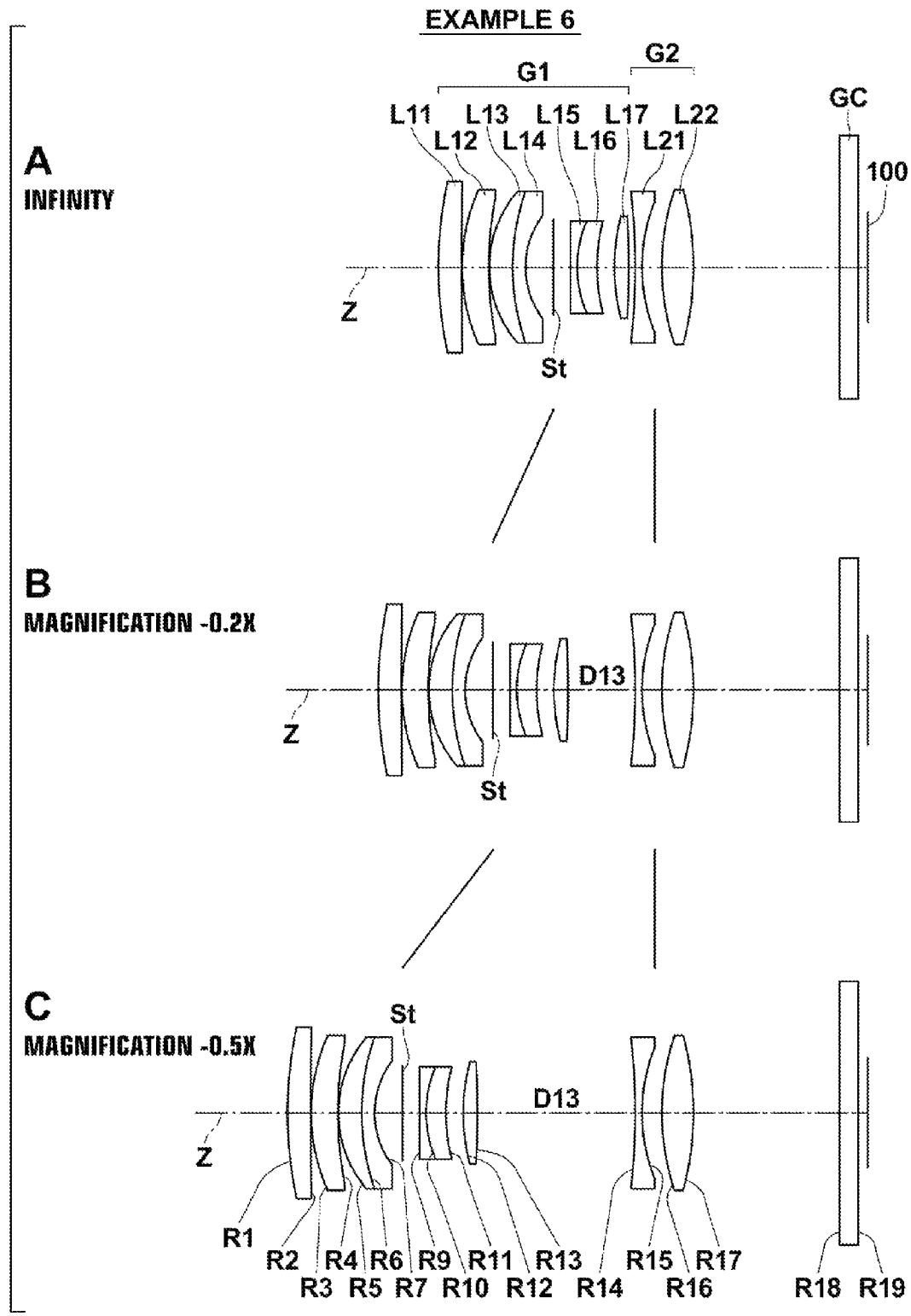
FIG. 6 is a cross-sectional view illustrating a sixth configuration of the medium telephoto lens, corresponding to a lens according to Numerical Example 6.

Hereinafter, embodiments of the present invention will be described in detail with reference to the accompanying drawings. A, B, and C of FIG. 1 show an example of a first configuration of the medium telephoto lens according to one embodiment of the present invention. This example of the configuration corresponds to the lens configuration of the first Numerical Example to be described later. Note that A of FIG. 1 corresponds to an optical system arrangement in a state focused on infinity, B of FIG. 1 corresponds to an optical system arrangement in a state of focus with a photographing magnification of −0.2×, and C of FIG. 1 corresponds to an optical system arrangement in a state of focus with a photographing magnification of −0.5×. Similarly, A, B, and C of FIG. 2 through A, B, and C of FIG. 6 show the cross-sectional configurations of the second through the sixth examples of configurations which correspond to lens configurations of the second through the sixth Numerical Examples to be described later. In A, B, and C of FIG. 1 through A, B, and C of FIG. 6, item Ri represents the radius of curvature of the i-th surface, the value of i sequentially increasing from the surface of the constituent element at the most-magnification side, which is designated as 1, toward the image side (image forming side). Item Di represents the distances between i-th surfaces and (i+1)st surfaces along the optical axis Z1. Note that regarding the item Di, an item is indicated at only the distance between surfaces (D13) of a portion which varies according to changes in the photographing magnification.

This medium telephoto lens substantially consists of a first lens group G1 and a second lens group G2 in this order from the object side along the optical axis Z. An optical aperture stop St is disposed in the first lens group G1.

This medium telephoto can be installed in imaging instruments, such as a mirrorless interchangeable-lens camera and the like, for example. An imaging element 100, such as a CCD (Charge Coupled Device), a CMOS (Complementary Metal Oxide Semiconductor), or the like is disposed at an imaging formation surface (imaging surface) of a camera equipped with this medium telephoto lens. The imaging element 100 outputs imaging signals corresponding to optical images formed by the medium telephoto lens of the present embodiment. The imaging device in the present embodiments is constituted by at least this medium telephoto lens and the imaging element 100. Various kinds of optical members GC may be arranged between the second lens group G2, which is the final lens group, and the imaging element 100 in accordance with the configuration of the camera side onto which the lens is mounted. For example, a parallel plate optical member, such as a cover glass for protecting an imaging surface, an infrared ray cut-off filter, or the like may be arranged therebetween. Note that A, B, and C of FIG. 1 through A, B, and C of FIG. 6 show the imaging element 100 and the optical member GC as well.

This medium telephoto lens is configured to perform focusing (or changing the photographing magnification) by moving the first lens group G1 along the optical axis Z and to change the distance between the first lens group G1 and the second lens group G2. Moreover, only the first lens group G1 is configured to move along the optical axis Z while focusing. The second lens group G2 is constantly fixed while focusing.

More particularly, as the photographing magnification is varied from a state focused on infinity to a photographing magnification of −0.2×, and to a photographing magnification of −0.5×, the first lens group L1 and the aperture stop St moves so as to draw a track as indicated by the solid lines, for example, from the state in A of FIG. 1 to the state in B of FIG. 1, and further to the state in C of FIG. 1.

The first lens group G1 has positive refractive power as a whole. The first lens group G1 substantially consists of a positive 1-1 lens L11 with a convex surface toward the object side, a positive 1-2 lens L12 with a convex surface toward the object side, a positive 1-3 lens L13 with a convex surface toward the object side, a negative 1-4 lens L14 with a concave surface toward the image side, an aperture stop St, a negative 1-5 lens L15 with a concave surface toward the image side, a positive 1-6 lens L16 with a convex surface toward the image side, and a positive 1-7 lens L17 with a convex surface toward the object side, in this order from the object side. Further, the 1-3 lens L13 and the 1-4 lens L14 are cemented to each other, and the 1-5 lens L15 and the 1-6 lens L16 are cemented to each other. Note that it is preferable for the 1-7 lens to be an aspheric lens in which at least one surface is configured to be aspheric.

Figure 4:
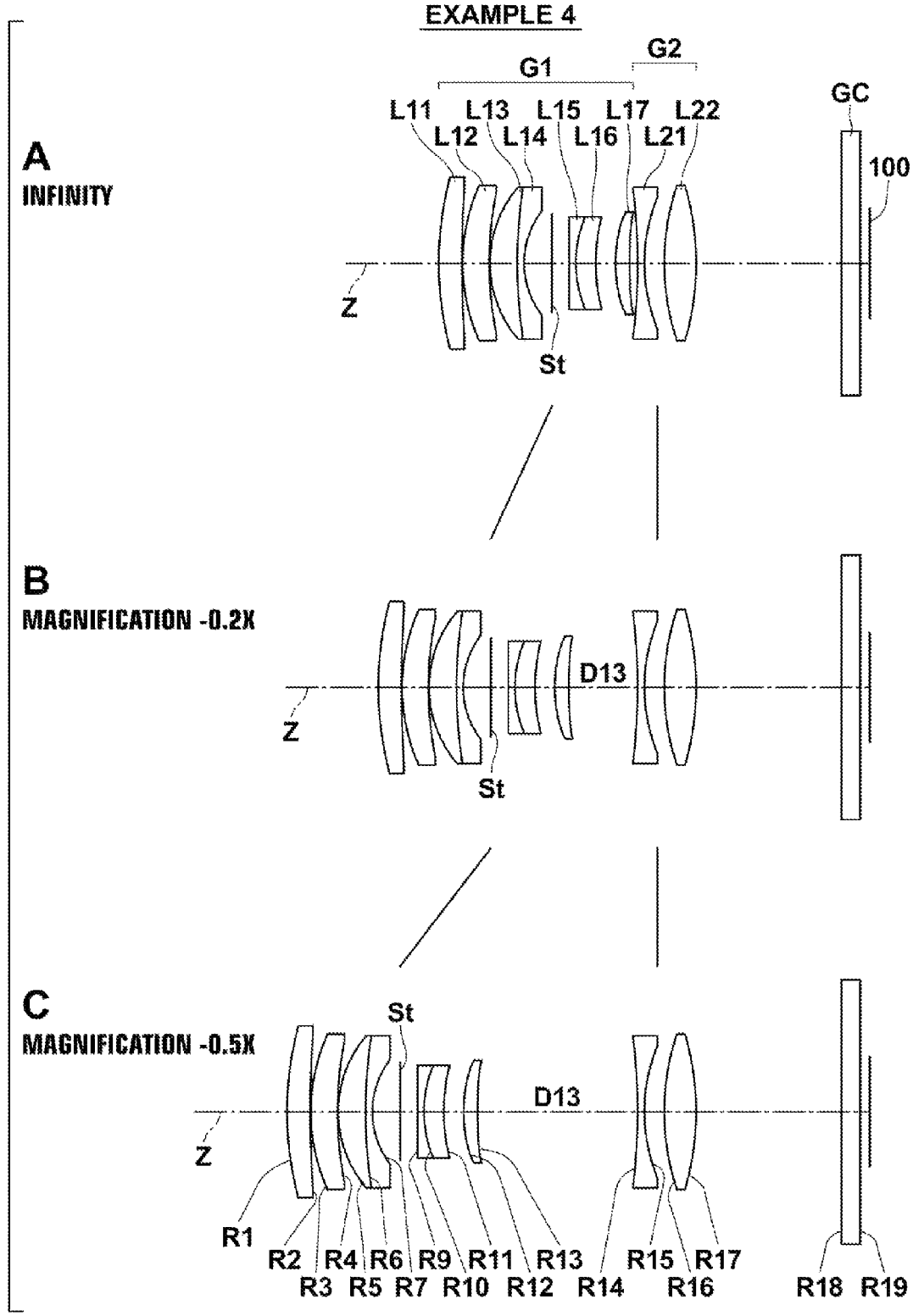
FIG. 4 is a cross-sectional view illustrating a fourth configuration of the medium telephoto lens, corresponding to a lens according to Numerical Example 4.

The second lens group G2 has positive refractive power as a whole. The second lens group G2 substantially consists of three lenses, a negative 2-1 lens L21 with a concave surface toward the image side, a positive 2-2 lens L22 with a convex surface toward the object side, and a positive 2-3 lens L23 with a convex surface toward the image side in this order from the object side as in an example of configurations shown in A, B, and C of FIG. 1 through A, B, and C of FIG. 3. Note that the second lens group G2 can substantially consist of two lenses, a negative 2-1 lens L21 with a concave surface toward the image side and a positive 2-2 lens L22 with a convex surface toward the object side in this order from the object side as in the examples of configurations shown in A, B, and C of FIG. 4 through A, B, and C of FIG. 6.

Next, preferred configurations of the medium telephoto lens according to the above embodiments of the present invention will be described. Note that the medium telephoto lens may have any one of the configurations described below, or may have arbitrary combinations of two or more of the following configurations.

It is preferable for the combined focal length of the first lens group G1 to satisfy conditional expression (1) below.

$$1.0 < fi/f1 < 1.3 \quad (1),$$

where fi: the focal length of the entire system while photographing an object at a distance of infinity, and f1: the combined focal length of the first lens group.

Moreover, it is preferable for the combined focal length of lenses that constitute the first lens group G1 to satisfy conditional expressions (2) and (3) below:

$$0.80 < fi/f1a < 1.5 \quad (2)$$

$$-0.4 < fi/f1b < 0.4 \quad (3),$$

where f1a: the combined focal length of the 1-1 lens L11 through the 1-4 lens L14, and f1b: the combined focal length of the 1-5 lens L15 through the 1-7 lens L17.

It is preferable for the difference in the Abbe numbers of the 1-5 lens L15 and the 1-6 lens L16 to satisfy conditional expression (4) below:

$$20.0 < vd6 - vd5 < 70.0 \quad (4),$$

where vd5: the Abbe number with respect to the d-line of the 1-5 lens L15, and vd6: the Abbe number with respect to the d-line of the 1-6 lens L16.

It is preferable for the difference in the Abbe numbers of the 1-3 lens L13 and the 1-4 lens L14 to satisfy conditional expression (5) below:

$$10 < vd3 - vd4 < 30 \quad (5),$$

where vd3: the Abbe number with respect to the d-line of the 1-3 lens, and vd4: the Abbe number with respect to the d-line of the 1-4 lens.

[Example of Application to Imaging Devices]

Figure 25A:
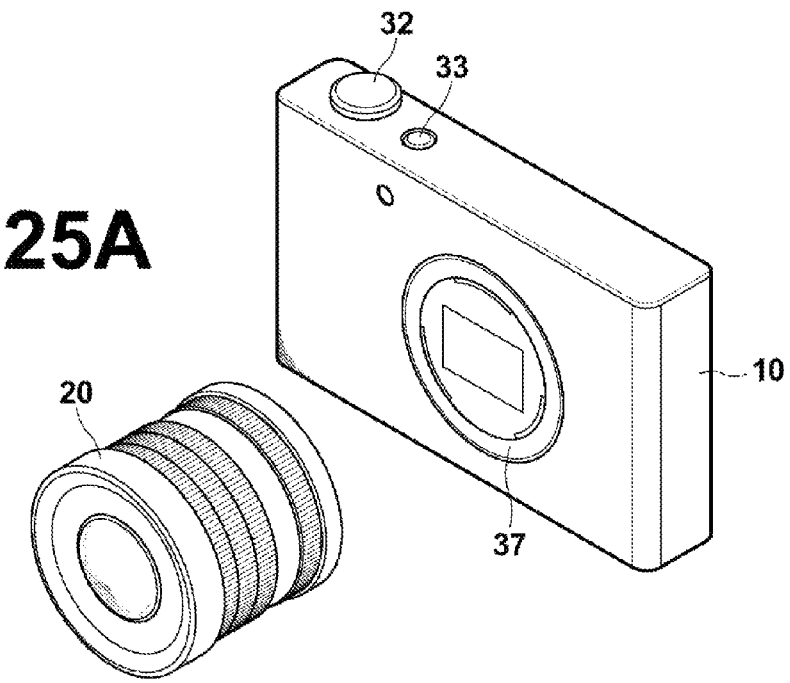
FIG. 25A is an outside drawing of a mirrorless interchangeable lens camera viewed from the front, illustrating one example of a configuration thereof as an imaging device according to one embodiment of the present invention.
Figure 25B:
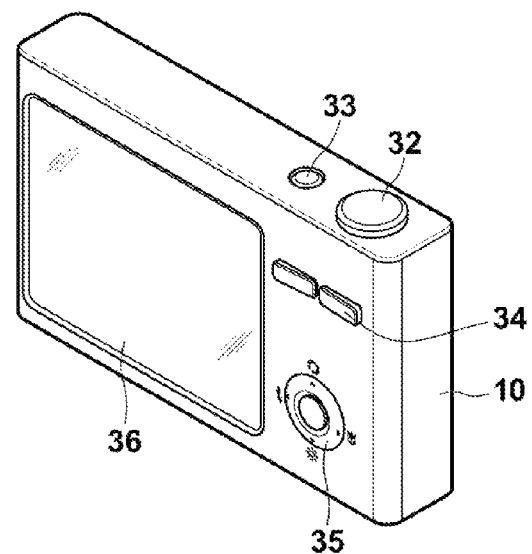
FIG. 25B is an outside drawing of a mirrorless interchangeable lens camera viewed from the back, illustrating one example of a configuration thereof as an imaging device according to one embodiment of the present invention.

FIGS. 25A and 25B show a mirrorless interchangeable lens camera as one example of the imaging device according to the present embodiments. Particularly, FIG. 25A shows the external appearance of this camera as viewed from the front, and FIG. 25B shows the external appearance of this camera as viewed from the back. This camera includes a camera body 10, and a shutter release button 32 and a power button 33 are provided on the upper surface side of the camera body 10. A display section 36 and operation sections 34 and 35 are provided on the back side of the camera body 10. The display section 36 is a section for displaying photographed images.

A photographing aperture, into which light from a photographing object enters, is provided in the center portion of the front side of the camera body 10, and a mount 37 is provided at a position corresponding to the photographing aperture. An interchangeable lens 20 is designed to be mounted on the camera body by the mount 37. The interchangeable lens 20 is a lens which houses lens members within a barrel. An imaging element, such as a CCD, or the like which outputs image signals corresponding to subject images formed by the interchangeable lens 20, a signal processing circuit which processes the image signals output from the imaging element and generates images, a recording medium for recording the generated images, and the like are provided within the camera body 10. In this camera, the shutter release button 32 is pressed and operated so that a still image for one frame is photographed and the image data obtained by the photographing operation is recorded in the recording medium (not shown) within the camera body 10.

If a medium telephoto lens according to the present embodiments is applied as the interchangeable lens 20 in such a mirrorless interchangeable lens camera, image signals having a high resolution can be obtained. Images with a high resolution can be generated within the camera body 10, based on the image signals.

[Operation/Effect]

Next, operations and effects of the medium telephoto lens constituted as described above will be described.

According to the medium telephoto lens of the present embodiments, only the first lens group G1 is caused to move in the direction of the optical axis Z when focusing, thereby eliminating the need to adopt a floating mechanism which moves both the first lens group and the second lens group as in the medium telephoto lenses disclosed in Japanese Unexamined Patent Publication No. 2 (1990)-081015 and Japanese Unexamined Patent Publication No. 2004-212692. This can simplify the mechanism for moving lenses while focusing, and miniaturization of the lens and low cost can be achieved as a result.

The 1-3 lens L13 and the 1-4 lens L14 that constitute the first lens group G1 are cemented to each other, which can favorably correct longitudinal chromatic aberration, thereby enabling attainment of good resolution with little change while changing magnification from infinity to a short distance.

Further, the second lens group G2 substantially consists of a negative 2-1 lens L21 with a concave surface toward the mage side, a positive 2-2 lens L22 with a convex surface toward the object side and a positive 2-3 lens L23 with a convex surface toward the image side in this order from the object side. This can reduce a change in field curvature while focusing, thereby enabling attainment of good resolution with little change while changing magnification from infinity to a short distance.

Further, the 1-7 lens L17 is configured to be an aspheric lens having at least one aspheric surface and therefore field curvature in the sagittal direction can be reduced in particular.

Further, if conditional expression (1) is satisfied, performance variation in the case that miniaturization and focusing are performed can be reduced. If the value of fi/f1 is lower than the lower limit defined by conditional expression (1), performance variation while focusing can be reduced, but the extending amount of the first lens group G1 while focusing will be increased and miniaturization will be difficult. If the value of fi/f1 exceeds the upper limit defined by conditional expression (1), the extending amount of the first lens group G1 while focusing will be decreased and this is advantageous from the viewpoint of miniaturization. However, performance variation while focusing will be increased and good resolution with little change while changing magnification from infinity to a short distance cannot be attained.

In order to achieve reduction of performance variation in the case that lenses are miniaturized and focusing is performed, it is preferable for conditional expression (1-1) below to be satisfied. Further, it is more preferable for conditional expression (1-2) below to be satisfied, and even more preferable for conditional expression (1-3) below to be satisfied.

$$1.05 < fi/f1 < 1.25 \quad (1\text{-}1),$$

$$1.08 < fi/f1 < 1.25 \quad (1\text{-}2), \text{ and}$$

$$1.11 < fi/f1 < 1.25 \quad (1\text{-}3).$$

If the combined focal length of lenses that constitute the first lens group G1 satisfy conditional expressions (2) and (3)

below, an emitting angle from the lenses to the image surface can be small, thereby enabling reduction of the effects on shading as well as achieving miniaturization.

If the value of fi/f1a is lower than the lower limit defined by conditional expression (2), the emitting angle from the lens to the image surface can be small, but the total length of the lens will be long and miniaturization will be difficult. If the value of fi/f1a exceeds the upper limit defined by conditional expression (2), the total length of the lens will be short and this is advantageous from the viewpoint of miniaturization. However, the emitting angle from the lens to the image surface will be large and the effects on shading will be increased.

If the value of fi/f1b is lower than the lower limit defined by conditional expression (3), the total length of the lens will be short and this is advantageous from the viewpoint of miniaturization. However, the emitting angle from the lens to the image surface will be large and the effects on shading will be increased. If the value of fi/f1b exceeds the upper limit defined by conditional expression (3), the emitting angle from the lens to the image surface can be small, but the total length of the lens will be long and miniaturization will be difficult.

In order to achieve further reduction of effects on miniaturization and shading of lenses, it is preferable for conditional expressions (2-1) and (3-1) below to be satisfied.

$$1.0 < fi/f1a < 1.3 \quad (2\text{-}1), \text{ and}$$

$$-0.3 < fi/f1b < 0.3 \quad (3\text{-}1).$$

If the difference in the Abbe numbers of the 1-5 lens L15 and the 1-6 lens L16 satisfies conditional expression (4), longitudinal chromatic aberration and lateral chromatic aberration can be reduced at the same time. If the value of vd6−vd5 is lower than the lower limit defined by conditional expression (4), lateral chromatic aberration during short distance photography can be reduced, but longitudinal chromatic aberration and lateral chromatic aberration during photography at an infinite distance will be increased. If the value of vd6−vd5 exceeds the upper limit defined by conditional expression (4), longitudinal chromatic aberration and lateral chromatic aberration during photography at an infinite distance can be reduced, but lateral chromatic aberration during short distance photography will be increased.

In order to enable further correction of longitudinal chromatic aberration and lateral chromatic aberration, it is preferable for conditional expression (4-1) below to be satisfied.

$$25.0 < vd6 - vd5 < 60.0 \quad (4\text{-}1)$$

If the difference in the Abbe numbers of the 1-3 lens L13 and the 1-4 lens L14 satisfies conditional expression (5), longitudinal chromatic aberration and lateral chromatic aberration can be suppressed at the same time. If the value of vd3−vd4 exceeds the upper limit defined by conditional expression (5), longitudinal chromatic aberration and lateral chromatic aberration during short distance photography can be reduced, but lateral chromatic aberration during photography at an infinite distance will be increased. If the value of vd3−vd4 is lower than the lower limit defined by conditional expression (5), lateral chromatic aberration during photography at an infinite distance can be reduced, but longitudinal chromatic aberration and lateral chromatic aberration during short distance photography will be increased.

In order to enable correction of further longitudinal chromatic aberration and lateral chromatic aberration, it is preferable for conditional expression (5-1) below to be satisfied.

$$16 < vd3 - vd4 < 30 \quad (5\text{-}1)$$

EXAMPLE

Next, specific numerical examples of the medium telephoto lens according to the present embodiments will be described. A plurality of numerical example will be partly summarized and described below.

Numerical Example 1

Tables 1 through 3 show specific lens data corresponding to configurations of the medium telephoto lens illustrated in A, B, and C of FIG. 1. Table 1 shows basic lens data thereof, and Tables 2 and 3 show other data. The column of item Si in the basic lens data shown in Table 1 with respect to the telephoto lens according to Example 1 represents the i-th (i=1 through 12) surface number, the value of i sequentially increasing from the surface of the constituent element at the most-object side, which is designated as 1, toward the image side. The column of the radius of curvature Ri represents the values (mm) of the radius of curvature of the i-th surface from the object side, which correspond to item Ri indicated in C of FIG. 1. The column of the distance between surfaces Di also represents distances (mm) between i-th surfaces and (i+1) st surfaces from the object side along the optical axis Z1. The column of item Ndj represents values of the refractive index with respect to the d-line (587.6 nm) between of i-th surfaces and (i+1) st surfaces from the object side. The column of item vdj represents the Abbe number with respect to the d-line of the j-th optical element from the object side. Table 1 also shows values of an axial focusing distance f (mm) of the entire system in a state focused on infinity, an F-number (FNO.), and an angle of view (2ω) as various data.

In the medium telephoto lens according to Example 1, the distance between the first lens group G1 and the second lens group G2 varies according to changes in the photographing magnification, and thus the value of the distance between surfaces D13, which is between the first lens group G1 and the second lens group G2, is variable. Table 2 shows values in a state focused on infinity, in a state of focus with a photographing magnification of −0.2×, and in a state of focus with a photographing magnification of −0.5×, as data of the distance between surfaces D13 with respect to changes in the photographing magnification.

In lens data of Table 1, the mark "*" is indicated at the left of surface numbers for lens surfaces which are aspheric surfaces. In the medium telephoto lens according to Example 1, both surfaces R12 and R13 of the 1-7 lens L17 which constitutes the first lens group G1 have an aspheric shape. In the basic lens data of Table 1, numerical values of paraxial radii of curvature are indicated as the radii of curvature of these aspheric surfaces.

Table 3 shows aspheric surface data in the medium telephoto lens according to Example 1. In numerical values shown as aspheric surface data, the mark "E" represents that a numerical value following the mark "E" is "an exponent" with the base-10. Further, a numerical value expressed by an exponential function with the base-10 is multiplied with a numerical value followed by "E". For example, the expression "1.0E-02" represents "$1.0 \times 10^{-2}$".

The aspheric surface data of the medium telephoto lens according to Example 1 shows values of respective coefficients An, K in the expression of an aspheric surface shape expressed by the formula (A) below. Z represents the length (mm) of a perpendicular line drawn from a point on an aspheric surface with a height h from the optical axis to a plane which contacts the peak of the aspheric surface (a plane perpendicular to the optical axis).

$$Zd = C \cdot Y^2 / \{1 + (1 - K \cdot C^2 \cdot Y^2)^{1/2}\} + \Sigma an \cdot Yn \quad (A)$$

(n=an integer of 3 or greater)
Z: the depth of an aspheric surface (mm)
Y: the distance (height) from the optical axis to a lens surface (mm)

K: an eccentricity
C: a paraxial curvature=1/R
 (R: a paraxial radius of curvature)
An: an aspheric surface coefficient of order n The aspheric surface of the medium telephoto lens according to Example 1 is expressed by effectively applying orders of A3 through A10 to an aspheric surface coefficient An, based on the above aspheric surface formula (A).

Numerical Examples 2 through 6

Figure 5:
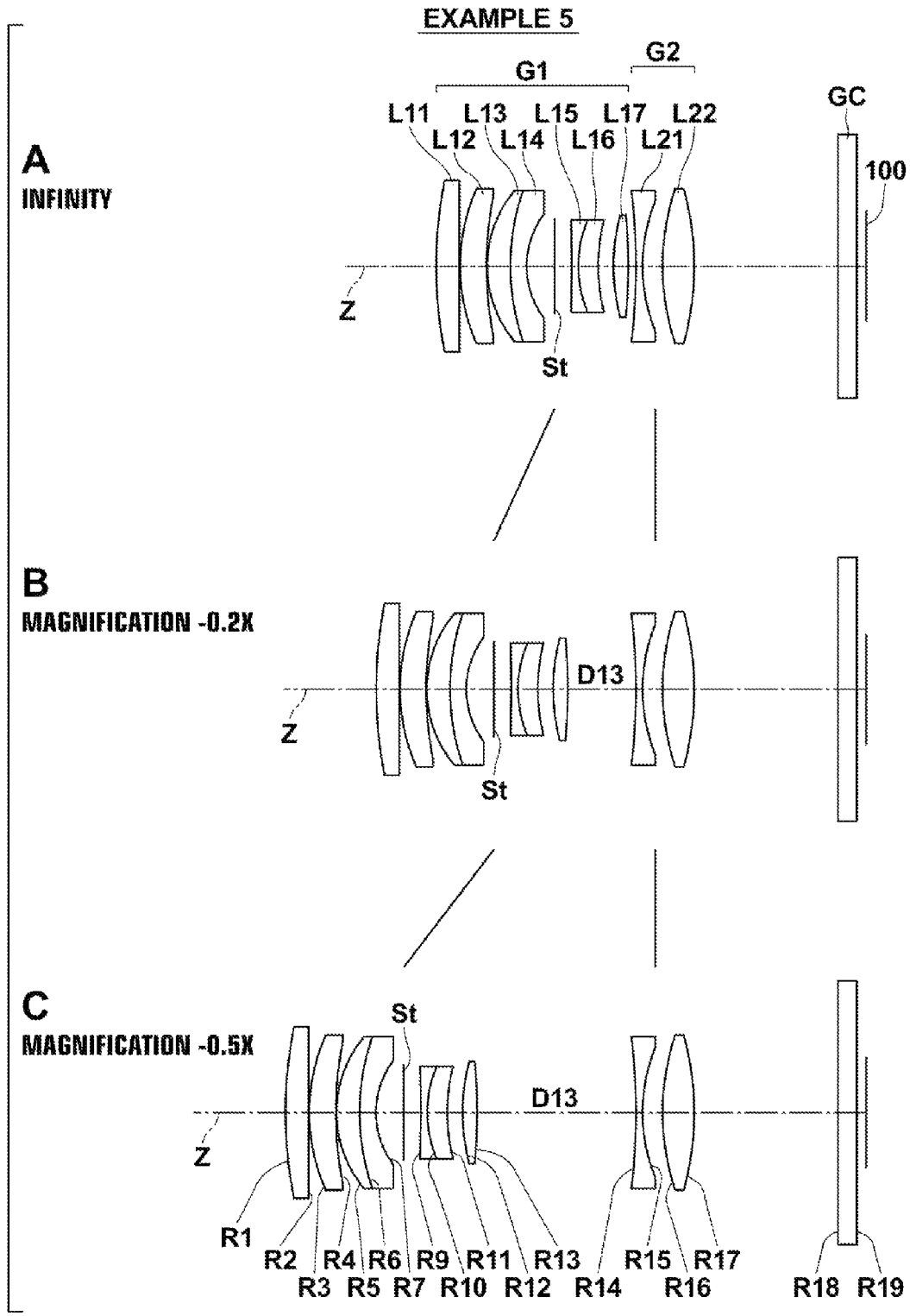
FIG. 5 is a cross-sectional view illustrating a fifth configuration of the medium telephoto lens, corresponding to a lens according to Numerical Example 5.

In the same manner as Numerical Example 1 described above, Tables 4 through 6, Tables 7 through 9, and Tables 10 through 12 respectively show specific lens data corresponding to configurations of the medium telephoto lenses illustrated in A, B, and C of FIG. 2; A, B, and C of FIG. 3; and A, B, and C of FIG. 4 as Numerical Examples 2, 3, and 4. Similarly, Tables 13 through 14 and Tables 15 through 16 respectively show specific lens data corresponding to configurations of the medium telephoto lenses illustrated A, B, and C of FIG. 5 and A, B, and C of FIG. 6 as Numerical Examples 5 and 6.

Note that in the medium telephoto lenses of Numerical Examples 2 through 4, both surfaces R12 and R13 of the 1-7 lens L17 have an aspheric shape in the same manner as in the medium telephoto lens according to Example 1. In the medium telephoto lenses of Numerical Examples 5 and 6, no lenses having aspheric surfaces are employed. Therefore, data regarding the aspheric surface is omitted in the medium telephoto lenses of Numerical Examples 5 and 6.

In the medium telephoto lenses of Numerical Examples 4 through 6, each second lens group G2 substantially consists of a 2-1 lens L21 which is a negative lens with a concave surface toward the image side and a 2-2 lens L22 which is a positive lens with a convex surface toward the object side in this order from the object side. Accordingly, the values of surface number Si go up to 19.

TABLE 1

| EXAMPLE 1 f = 61.06 FNO. = 2.48 2ω = 25.4 DEGREE | | | | |
|---|---|---|---|---|
| Si | Ri | Di | Ndi | vdj |
| 1 | 51.9744 | 3.17 | 1.48749 | 70.2 |
| 2 | ∞ | 0.10 | 1.00000 | |
| 3 | 28.9998 | 3.80 | 1.58913 | 61.1 |
| 4 | 52.7228 | 0.10 | 1.00000 | |
| 5 | 18.5122 | 5.50 | 1.72916 | 54.7 |
| 6 | 57.1350 | 1.16 | 1.66680 | 31.1 |
| 7 | 12.7943 | 4.20 | 1.00000 | |
| 8 (APERTURE STOP) | ∞ | 2.60 | 1.00000 | |
| 9 | −317.3207 | 1.01 | 1.51742 | 48.8 |
| 10 | 17.1800 | 2.80 | 1.49700 | 81.5 |
| 11 | 52.4398 | 2.54 | 1.00000 | |
| *12 | 34.5881 | 2.60 | 1.80348 | 40.4 |
| *13 | 106.5522 | D13 (VARIABLE) | 1.00000 | |
| 14 | ∞ | 1.80 | 1.72916 | 54.7 |
| 15 | 22.4660 | 3.55 | 1.00000 | |
| 16 | 28.6691 | 2.82 | 1.51823 | 58.9 |
| 17 | 77.4943 | 1.81 | 1.00000 | |
| 18 | 236.5466 | 3.00 | 1.80400 | 46.6 |
| 19 | −56.9828 | 18.46 | 1.00000 | |
| 20 | ∞ | 2.85 | 1.51680 | 64.2 |
| 21 | ∞ | | 1.00000 | |

TABLE 2

| DISTANCE BETWEEN SURFACES | INFINITY | MAGNIFICATION −0.2X | MAGNIFICATION −0.5X |
|---|---|---|---|
| D13 | 1.80 | 10.57 | 23.73 |

TABLE 3

| SURFACE NUMBER | K | A3 | A4 | A5 | A6 |
|---|---|---|---|---|---|
| 12 | −3.054014E+01 | −1.886310E−04 | 2.861281E−04 | −7.198710E−05 | 1.134194E−05 |
| 13 | 6.010862E+01 | −1.680437E−04 | 1.554805E−04 | −5.548409E−05 | 1.067906E−05 |

| | A7 | A8 | A9 | A10 |
|---|---|---|---|---|
| 12 | −2.726246E−07 | −1.992572E−07 | 2.806654E−08 | −1.181930E−09 |
| 13 | −1.051099E−06 | 4.143267E−08 | 3.478004E−10 | −4.029777E−11 |

TABLE 4

| EXAMPLE 2 f = 60.99 FNO. = 2.48 2ω = 25.4 DEGREE | | | | |
|---|---|---|---|---|
| Si | Ri | Di | Ndi | vdj |
| 1 | 60.0001 | 3.10 | 1.48749 | 70.2 |
| 2 | −459.2095 | 0.10 | 1.00000 | |
| 3 | 29.0000 | 3.30 | 1.58913 | 61.1 |
| 4 | 53.5741 | 0.10 | 1.00000 | |
| 5 | 17.7781 | 5.41 | 1.72916 | 54.7 |
| 6 | 35.0000 | 1.21 | 1.68893 | 31.1 |
| 7 | 12.6728 | 4.20 | 1.00000 | |
| 8(APERTURE STOP) | ∞ | 2.60 | 1.00000 | |
| 9 | −9533.8848 | 1.01 | 1.53172 | 48.8 |
| 10 | 19.4472 | 2.50 | 1.49700 | 81.5 |
| 11 | 53.8099 | 3.22 | 1.00000 | |
| *12 | 36.6104 | 2.80 | 1.80348 | 40.4 |
| *13 | 108.3847 | D13 (VARIABLE) | 1.00000 | |
| 14 | −1000.4517 | 1.00 | 1.72916 | 54.7 |
| 15 | 22.8617 | 3.00 | 1.00000 | |
| 16 | 27.7883 | 2.44 | 1.51823 | 58.9 |
| 17 | 50.0258 | 2.00 | 1.00000 | |
| 18 | 103.6883 | 3.26 | 1.80400 | 46.6 |
| 19 | −61.3497 | 19.35 | 1.00000 | |
| 20 | ∞ | 2.85 | 1.51680 | 64.2 |
| 21 | ∞ | | 1.00000 | |

TABLE 5

| DISTANCE BETWEEN SURFACES | INFINITY | MAGNIFICATION −0.2X | MAGNIFICATION −0.5X |
|---|---|---|---|
| D13 | 1.80 | 10.67 | 23.98 |

TABLE 6

| SURFACE NUMBER | K | A3 | A4 | A5 | A6 |
|---|---|---|---|---|---|
| 12 | −3.404029E+01 | −1.956021E−04 | 2.738637E−04 | −7.035081E−05 | 1.122946E−05 |
| 13 | 9.873388E+01 | −1.865668E−04 | 1.553984E−04 | −5.738833E−05 | 1.086670E−05 |

| | A7 | A8 | A9 | A10 |
|---|---|---|---|---|
| 12 | −2.788162E−07 | −1.995961E−07 | 2.844800E−08 | −1.210933E−09 |
| 13 | −1.046668E−06 | 4.050123E−08 | 8.077073E−11 | −1.960878E−11 |

TABLE 7

EXAMPLE 3 f = 60.00 FNO. = 2.48 2ω = 25.8 DEGREE

| Si | Ri | Di | Ndi | vdj |
|---|---|---|---|---|
| 1 | 57.4397 | 3.50 | 1.48749 | 70.2 |
| 2 | −318.1500 | 0.10 | 1.00000 | |
| 3 | 29.0000 | 4.00 | 1.58913 | 61.1 |
| 4 | 53.9766 | 0.10 | 1.00000 | |
| 5 | 17.5000 | 4.97 | 1.72916 | 54.7 |
| 6 | 35.5069 | 1.01 | 1.66680 | 33.1 |
| 7 | 12.7710 | 4.20 | 1.00000 | |
| 8 (APERTURE STOP) | ∞ | 2.60 | 1.00000 | |
| 9 | −299.9981 | 1.01 | 1.59551 | 39.2 |
| 10 | 17.3358 | 3.00 | 1.49700 | 81.5 |
| 11 | 28.4491 | 1.68 | 1.00000 | |
| *12 | 27.0007 | 2.80 | 1.80348 | 40.4 |
| *13 | 250.3329 | D13 (VARIABLE) | 1.00000 | |
| 14 | −437.9348 | 1.00 | 1.80400 | 46.6 |
| 15 | 24.5065 | 3.00 | 1.00000 | |
| 16 | 30.1064 | 2.42 | 1.48749 | 70.2 |
| 17 | 58.0800 | 2.00 | 1.00000 | |
| 18 | 95.5653 | 3.41 | 1.80610 | 40.9 |
| 19 | −57.2401 | 20.41 | 1.00000 | |
| 20 | ∞ | 2.85 | 1.51680 | 64.2 |
| 21 | ∞ | | 1.00000 | |

TABLE 8

| DISTANCE BETWEEN SURFACES | INFINITY | MAGNIFICATION −0.2X | MAGNIFICATION −0.5X |
|---|---|---|---|
| D13 | 1.50 | 9.86 | 22.41 |

TABLE 9

| SURFACE NUMBER | K | A3 | A4 | A5 | A6 |
|---|---|---|---|---|---|
| 12 | −2.271221E+01 | −4.311992E−05 | 2.603302E−04 | −4.515822E−05 | 6.428805E−06 |
| 13 | −9.999996E+01 | −7.853603E−06 | 6.591844E−05 | −1.694469E−05 | 2.651641E−06 |

| | A7 | A8 | A9 | A10 |
|---|---|---|---|---|
| 12 | −1.972510E−07 | −1.055141E−07 | 1.579749E−08 | −6.668258E−10 |
| 13 | −2.262231E−07 | 4.873960E−08 | −8.183120E−09 | 4.768882E−10 |

TABLE 10

EXAMPLE 4 f = 58.21 FNO. = 2.50 2ω = 26.8 DEGREE

| Si | Ri | Di | Ndi | vdj |
|---|---|---|---|---|
| 1 | 50.2298 | 3.50 | 1.72916 | 54.7 |
| 2 | 177.7672 | 0.10 | 1.00000 | |

TABLE 10-continued

EXAMPLE 4 f = 58.21 FNO. = 2.50 2ω = 26.8 DEGREE

| Si | Ri | Di | Ndi | vdj |
|---|---|---|---|---|
| 3 | 29.0000 | 4.00 | 1.62041 | 60.3 |
| 4 | 54.0982 | 0.10 | 1.00000 | |
| 5 | 17.6912 | 4.13 | 1.80610 | 40.9 |
| 6 | 75.6007 | 1.01 | 1.72825 | 28.5 |
| 7 | 13.0001 | 4.20 | 1.00000 | |
| 8 (APERTURE STOP) | ∞ | 2.60 | 1.00000 | |
| 9 | ∞ | 1.00 | 1.62588 | 35.7 |
| 10 | 18.0000 | 3.01 | 1.49700 | 81.5 |
| 11 | 28.1242 | 3.00 | 1.00000 | |
| *12 | 23.4897 | 2.12 | 1.68893 | 31.1 |
| *13 | 110.7714 | D13 (VARIABLE) | 1.00000 | |
| 14 | −90.6983 | 1.00 | 1.80400 | 46.6 |
| 15 | 26.3971 | 3.00 | 1.00000 | |
| 16 | 37.1302 | 4.80 | 1.71300 | 53.9 |
| 17 | −42.1003 | 21.88 | 1.00000 | |
| 18 | ∞ | 2.85 | 1.51680 | 64.2 |
| 19 | ∞ | | 1.00000 | |

TABLE 11

| DISTANCE BETWEEN SURFACES | INFINITY | MAGNIFICATION −0.2X | MAGNIFICATION −0.5X |
|---|---|---|---|
| D13 | 1.20 | 10.36 | 24.10 |

TABLE 12

| SURFACE NUMBER | K | A3 | A4 | A5 | A6 |
|---|---|---|---|---|---|
| 12 | 1.000000E+00 | 0.000000E+00 | 2.795101E−05 | 0.000000E+00 | 3.712799E−07 |
| 13 | 1.000000E+00 | 0.000000E+00 | 4.010963E−05 | 0.000000E+00 | 4.433925E−07 |

| | A7 | A8 | A9 | A10 |
|---|---|---|---|---|
| 12 | 0.000000E+00 | −2.941544E−09 | 0.000000E+00 | 1.312374E−10 |
| 13 | 0.000000E+00 | −5.119166E−09 | 0.000000E+00 | 1.762382E−10 |

TABLE 13

EXAMPLE 5 f = 58.18 FNO. = 2.48 2ω = 26.8 DEGREE

| Si | Ri | Di | Ndi | νdj |
|---|---|---|---|---|
| 1 | 66.0370 | 3.50 | 1.72916 | 54.7 |
| 2 | 9292.0508 | 0.10 | 1.00000 | |
| 3 | 29.0000 | 4.00 | 1.72916 | 54.7 |
| 4 | 54.0875 | 0.10 | 1.00000 | |
| 5 | 17.9265 | 3.50 | 1.80400 | 46.6 |
| 6 | 35.0000 | 2.47 | 1.80000 | 29.8 |
| 7 | 13.1390 | 4.20 | 1.00000 | |
| 8 (APERTURE STOP) | ∞ | 2.60 | 1.00000 | |
| 9 | −264.2298 | 1.00 | 1.81518 | 25.4 |
| 10 | 18.0000 | 3.01 | 1.49700 | 81.5 |
| 11 | 28.1208 | 2.33 | 1.00000 | |
| 12 | 30.1281 | 2.20 | 1.78700 | 26.3 |
| 13 | −91.9091 | D13 (VARIABLE) | 1.00000 | |
| 14 | −96.6142 | 1.00 | 1.80400 | 46.6 |
| 15 | 26.6669 | 3.00 | 1.00000 | |
| 16 | 37.3545 | 4.80 | 1.71300 | 53.9 |
| 17 | −43.9769 | 21.73 | 1.00000 | |
| 18 | ∞ | 2.85 | 1.51680 | 64.2 |
| 19 | ∞ | | 1.00000 | |

TABLE 14

| DISTANCE BETWEEN SURFACES | INFINITY | MAGNIFICATION −0.2X | MAGNIFICATION −0.5X |
|---|---|---|---|
| D13 | 1.21 | 10.34 | 24.04 |

TABLE 15

EXAMPLE 6 f = 58.19 FNO. = 2.48 2ω = 26.8 DEGREE

| Si | Ri | Di | Ndi | νdj |
|---|---|---|---|---|
| 1 | 61.4373 | 3.50 | 1.75500 | 52.3 |
| 2 | 617.7504 | 0.10 | 1.00000 | |
| 3 | 29.0000 | 4.00 | 1.72916 | 54.7 |
| 4 | 54.0884 | 0.10 | 1.00000 | |
| 5 | 17.6348 | 3.55 | 1.80400 | 46.6 |
| 6 | 35.0000 | 1.96 | 1.80000 | 29.8 |
| 7 | 13.2126 | 4.20 | 1.00000 | |
| 8 (APERTURE STOP) | ∞ | 2.60 | 1.00000 | |
| 9 | −1779.0479 | 1.00 | 1.80518 | 25.4 |
| 10 | 18.0000 | 3.01 | 1.49700 | 81.5 |
| 11 | 28.1240 | 2.62 | 1.00000 | |
| 12 | 30.9963 | 2.17 | 1.80518 | 25.4 |
| 13 | −140.2612 | D13 (VARIABLE) | 1.00000 | |
| 14 | −99.1042 | 1.00 | 1.80400 | 46.6 |
| 15 | 26.7466 | 3.00 | 1.00000 | |
| 16 | 36.8747 | 4.80 | 1.71300 | 53.9 |
| 17 | −45.4460 | 22.10 | 1.00000 | |
| 18 | ∞ | 2.85 | 1.51680 | 64.2 |
| 19 | ∞ | | 1.00000 | |

TABLE 16

| DISTANCE BETWEEN SURFACES | INFINITY | MAGNIFICATION −0.2X | MAGNIFICATION −0.5X |
|---|---|---|---|
| D13 | 1.00 | 10.15 | 23.87 |

[The Other Numerical Data of Each Example]

Table 17 collectively shows numerical values with respect to the conditional expressions above for each Example. As can be seen from Table 17, the values of each of the Examples are within the numerical range of the respective conditional expressions (1) through (5).

TABLE 17

| CONDITIONAL EXPRESSION | (1) fi/f1 | (2) fi/f1a | (3) fi/f1b | (4) νd6 − νd5 | (5) νd3 − νd4 |
|---|---|---|---|---|---|
| EXAMPLE 1 | 1.179 | 1.087 | 0.248 | 29.1 | 23.6 |
| EXAMPLE 2 | 1.172 | 1.079 | 0.252 | 32.7 | 23.6 |
| EXAMPLE 3 | 1.198 | 1.180 | 0.163 | 42.3 | 21.6 |
| EXAMPLE 4 | 1.127 | 1.215 | 0.009 | 45.8 | 12.4 |
| EXAMPLE 5 | 1.129 | 1.276 | 0.036 | 56.1 | 16.8 |
| EXAMPLE 6 | 1.128 | 1.285 | −0.001 | 56.1 | 16.8 |

[Aberration Performance]

Figures 7, 8:
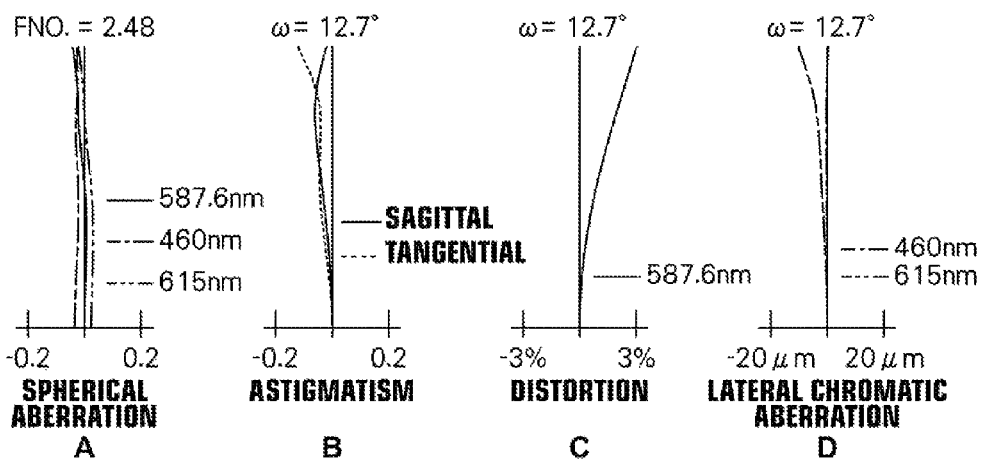
FIG. 7 is a diagram illustrating various aberrations of the medium telephoto lens according to Example 1, which is in a state focused on infinity, showing A as spherical aberration, B as astigmatism, C as distortion, and D as lateral chromatic aberration.
FIG. 8 is a diagram illustrating various aberrations of the medium telephoto lens according to Example 1, which is in a state of focus with a photographing magnification of −0.2×, showing A as spherical aberration, B as astigmatism, C as distortion, and D as lateral chromatic aberration.
Figure 9:
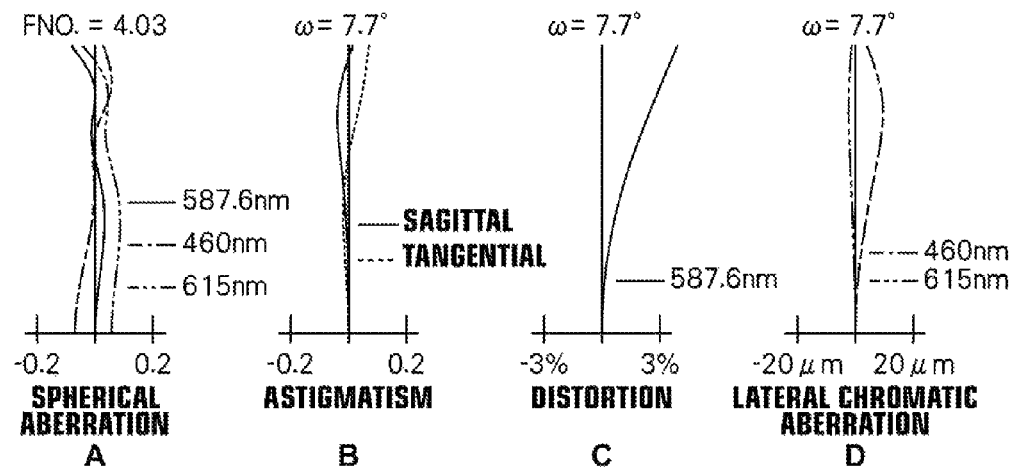
FIG. 9 is a diagram illustrating various aberrations of the medium telephoto lens according to Example 1, which is in a state of focus with a photographing magnification of −0.5×, showing A as spherical aberration, B as astigmatism, C as distortion, and D as lateral chromatic aberration.

A through D of FIG. 7 respectively show spherical aberration, astigmatism, distortion, and lateral chromatic aberration of the medium telephoto lens according to Numerical Example 1, which is in a state focused on infinity. A through D of FIG. 8 respectively show the same aberrations as described above of the medium telephoto lens, which is in a state of focus with a photographing magnification of −0.2×, and A through D of FIG. 9 respectively show the same aberrations as described above of the medium telephoto lens, which is in a state of focus with a photographing magnification of −0.5×. Each of the aberration diagrams shows aberration with respect to the d-line (587.6 nm) which is the reference wavelength. The spherical aberration diagram and lateral chromatic aberration diagram also show aberration with respect to a wavelength of 460 nm and aberration with respect to a wavelength of 615 nm. The astigmatism diagram shows aberration in a sagittal direction with a solid line and aberration in a tangential direction with a dotted line. The sign "Fno." refers to an F-number, and the sign "ω" refers to a half angle of view.

Figure 10:
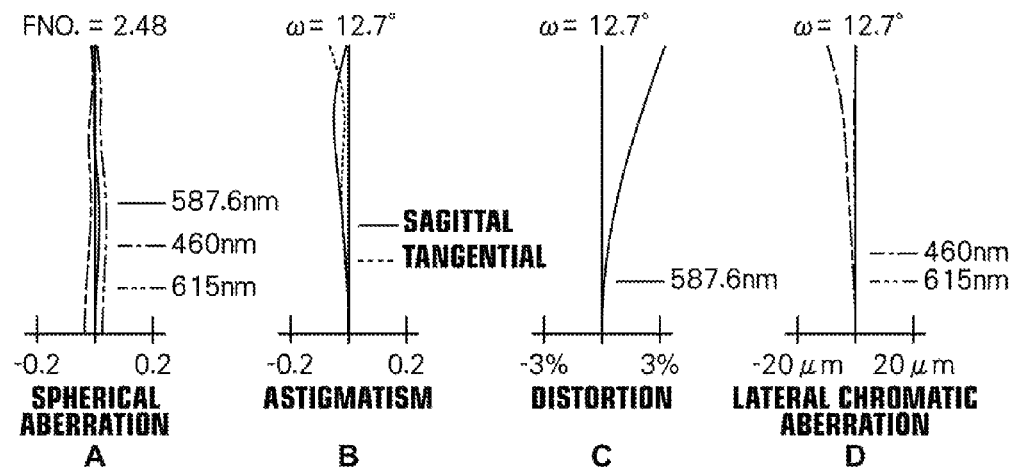
FIG. 10 is a diagram illustrating various aberrations of a medium telephoto lens according to Example 2, which is in a state focused on infinity, showing A as spherical aberration, B as astigmatism, C as distortion, and D as lateral chromatic aberration.
Figure 11:
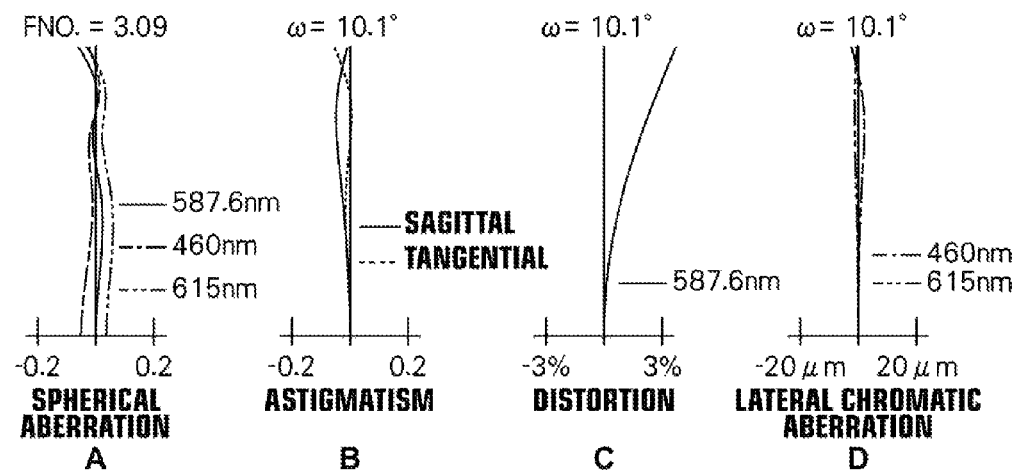
FIG. 11 is a diagram illustrating various aberrations of the medium telephoto lens according to Example 2, which is in a state of focus with a photographing magnification of −0.2×, showing A as spherical aberration, B as astigmatism, C as distortion, and D as lateral chromatic aberration.
Figure 12:
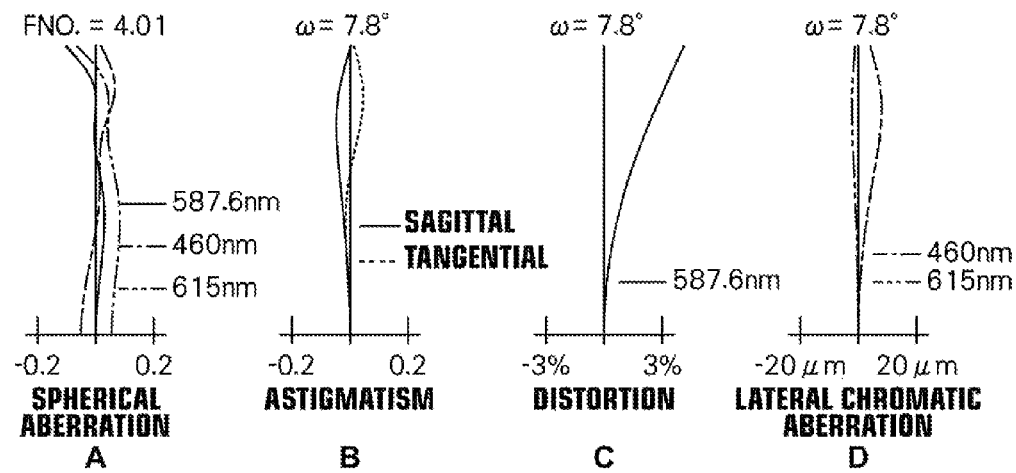
FIG. 12 is a diagram illustrating various aberrations of the medium telephoto lens according to Example 2, which is in a state of focus with a photographing magnification of −0.5×, showing A as spherical aberration, B as astigmatism, C as distortion, and D as lateral chromatic aberration.
Figure 13:
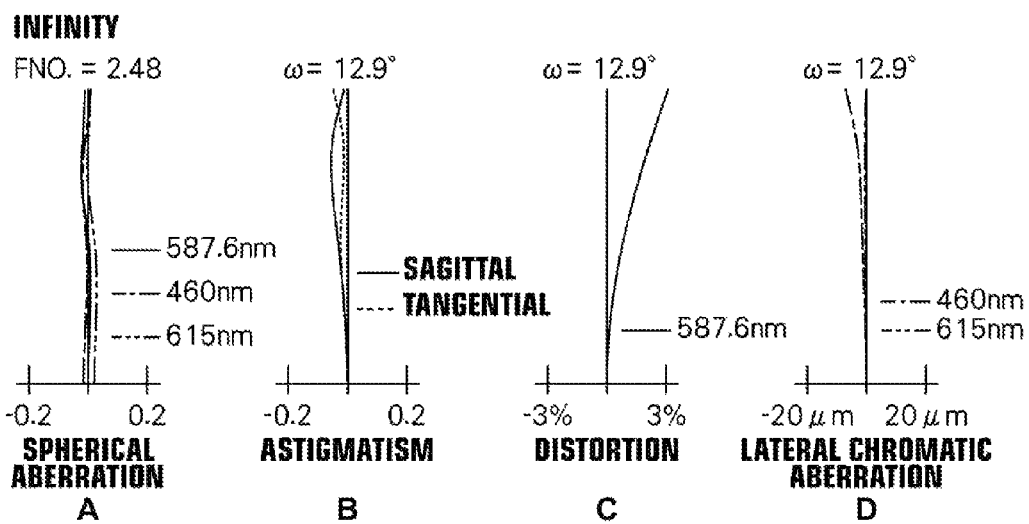
FIG. 13 is a diagram illustrating various aberrations of a medium telephoto lens according to Example 3, which is in a state focused on infinity, showing A as spherical aberration, B as astigmatism, C as distortion, and ID as lateral chromatic aberration.
Figure 14:
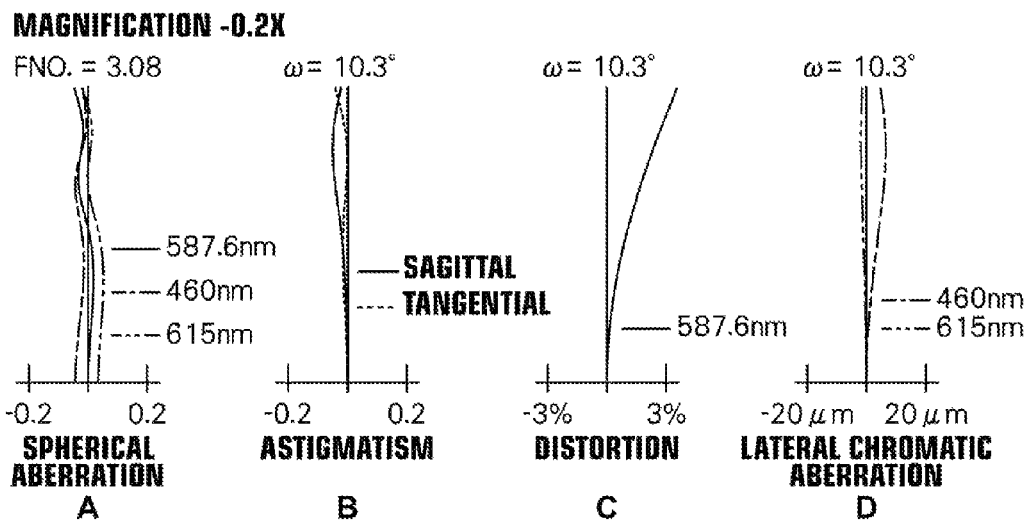
FIG. 14 is a diagram illustrating various aberrations of the medium telephoto lens according to Example 3, which is in a state of focus with a photographing magnification of −0.2×, showing A as spherical aberration, B as astigmatism, C as distortion, and D as lateral chromatic aberration.
Figures 15, 16:
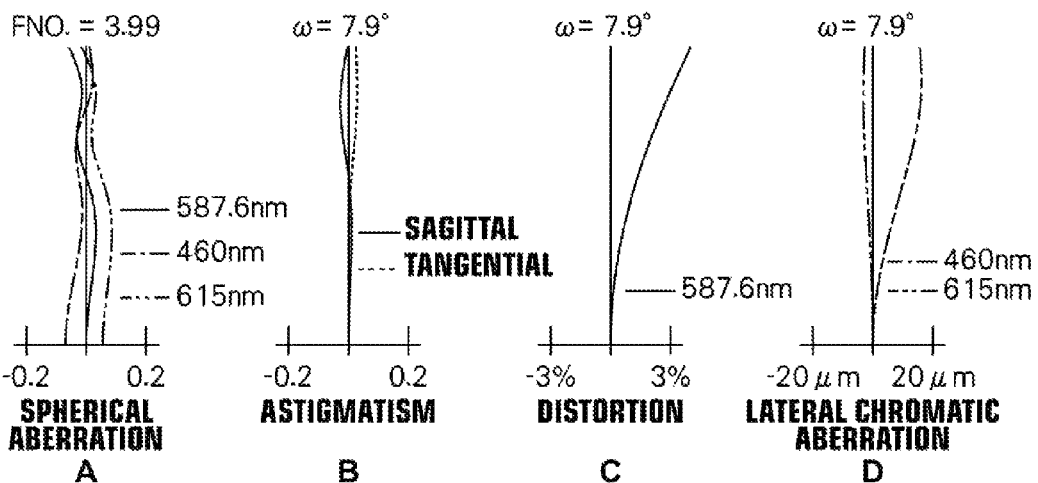
FIG. 15 is a diagram illustrating various aberrations of the medium telephoto lens according to Example 3, which is in a state of focus with a photographing magnification of −0.5×, showing A as spherical aberration, B as astigmatism, C as distortion, and D as lateral chromatic aberration.
FIG. 16 is a diagram illustrating various aberrations of a medium telephoto lens according to Example 4, which is in a state focused on infinity, showing A as spherical aberration, B as astigmatism, C as distortion, and D as lateral chromatic aberration.
Figure 17:
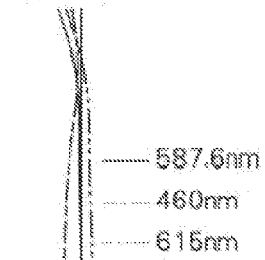
FIG. 17 is a diagram illustrating various aberrations of the medium telephoto lens according to Example 4, which is in a state of focus with a photographing magnification of −0.2×, showing A as spherical aberration, B as astigmatism, C as distortion, and D as lateral chromatic aberration.
Figure 18:
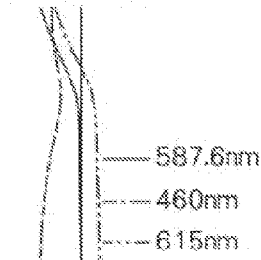
FIG. 18 is a diagram illustrating various aberrations of the medium telephoto lens according to Example 4, which is in a state of focus with a photographing magnification of −0.5×, showing A as spherical aberration, B as astigmatism, C as distortion, and D as lateral chromatic aberration.
Figure 21:
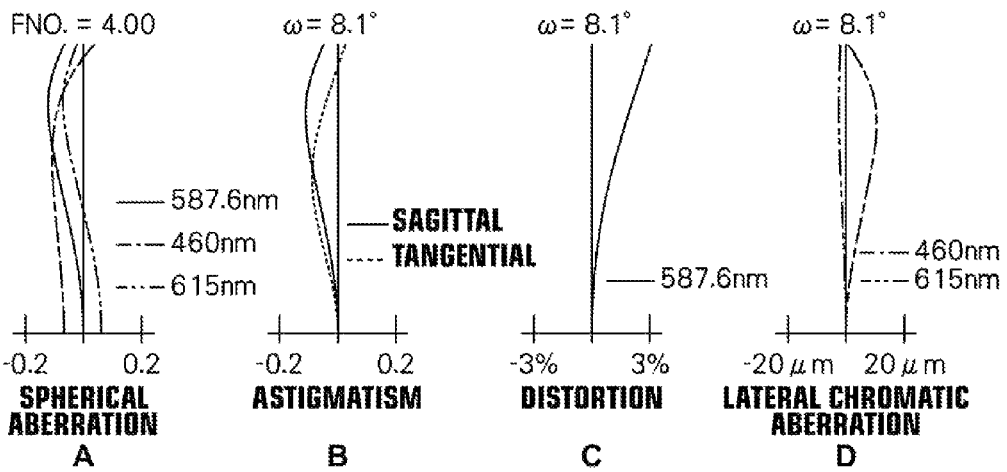
FIG. 21 is a diagram illustrating various aberrations of the medium telephoto lens according to Example 5, which is in a state of focus with a photographing magnification of −0.5×, showing A as spherical aberration, B as astigmatism, C as distortion, and D as lateral chromatic aberration.
Figure 22:
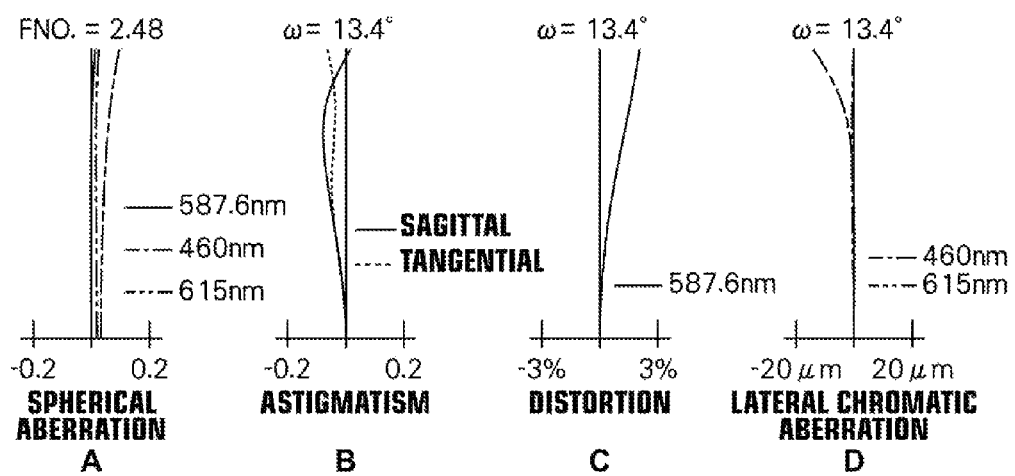
FIG. 22 is a diagram illustrating various aberrations of a medium telephoto lens according to Example 6, which is in a state focused on infinity, showing A as spherical aberration, B as astigmatism, C as distortion, and D as lateral chromatic aberration.
Figure 23:
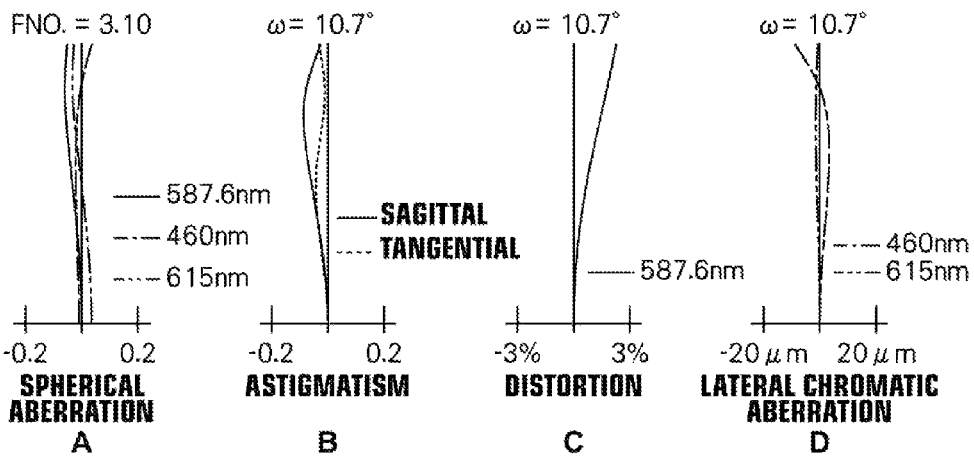
FIG. 23 is a diagram illustrating various aberrations of the medium telephoto lens according to Example 6, which is in a state of focus with a photographing magnification of −0.2×, showing A as spherical aberration, B as astigmatism, C as distortion, and D as lateral chromatic aberration.
Figure 24:
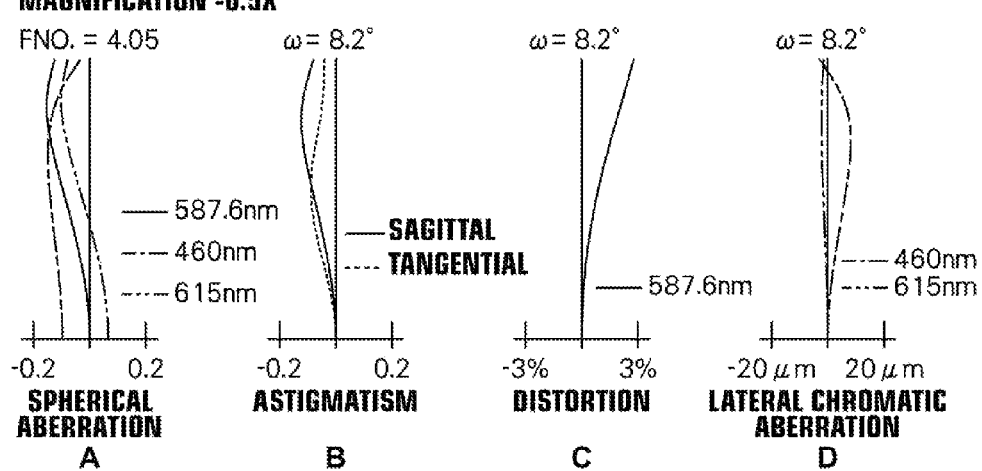
FIG. 24 is a diagram illustrating various aberrations of the medium telephoto lens according to Example 6, which is in a state of focus with a photographing magnification of −0.5×, showing A as spherical aberration, B as astigmatism, C as distortion, and D as lateral chromatic aberration.

Similarly, various aberrations with respect to the medium telephoto lens according to Numerical Example 2 are shown in A through D of FIG. 10 (infinity), in A through D of FIG. 11 (photographing magnification of −0.2×), and in A through D of FIG. 12 (photographing magnification of −0.5×). Similarly, various aberrations with respect to the medium telephoto lens according to Numerical Examples 3 through 6 are shown in A through D of FIGS. 13 through 24.

As can be seen from the respective numerical value data and aberration diagrams as shown above, a medium telephoto lens, which is miniaturized as a whole while enabling satisfactory correction of various aberrations in each range of photographing magnifications and short-distance photographing, is realized.

The present invention is not limited to the Embodiments and Examples described above, and various modifications are possible. For example, values, such as the radius of curvature of each lens element, the distances between surfaces, the refractive indices, and the like are not limited to the values shown in the respective Numerical Examples above, and other values can be taken.

What is claimed is:

1. A medium telephoto lens which substantially consists of a first lens group having positive refractive power and a second lens group in order from an object side,
    wherein the first lens group substantially consists of a positive 1-1 lens with a convex surface toward the object side, a positive 1-2 lens with a convex surface toward the object side, a positive 1-3 lens with a convex surface toward the object side; a negative 1-4 lens with a concave surface toward an image side; an aperture stop, a negative 1-5 lens with a concave surface toward the image side, a positive 1-6 lens with a convex surface toward the object side, and a positive 1-7 lens with a convex surface toward the object side, in this order from the object side;
    the 1-3 lens and the 1-4 lens are cemented to each other and the 1-5 lens and the 1-6 lens are cemented to each other;
    the second lens group substantially consists of a negative 2-1 lens with a concave surface toward the image side and a positive 2-2 lens with a convex surface toward the object side; and
    only the first lens group moves in the optical axis direction while focusing.

2. The medium telephoto lens of claim 1, wherein conditional expression (1) below is satisfied:

$$1.0 < fi/f1 < 1.3 \quad (1), \text{where}$$

fi: the focal length of the entire system while photographing an object at a distance of infinity, and
f1: the combined focal length of the first lens group.

3. The medium telephoto lens of claim 1, wherein conditional expression (1-1) below is satisfied:

$$1.05 < fi/f1 < 1.25 \quad (1-1), \text{where}$$

fi: the focal length of the entire system while photographing an object at a distance of infinity, and
f1: the combined focal length of the first lens group.

4. The medium telephoto lens of claim 1, wherein conditional expression (1-2) below is satisfied:

$$1.08 < fi/f1 < 1.25 \quad (1-2), \text{where}$$

fi: the focal length of the entire system while photographing an object at a distance of infinity, and
f1: the combined focal length of the first lens group.

5. The medium telephoto lens of claim 1, wherein conditional expression (1-3) below is satisfied:

$$1.11 < fi/f1 < 1.25 \quad (1-3), \text{where}$$

fi: the focal length of the entire system while photographing an object at a distance of infinity, and
f1: the combined focal length of the first lens group.

6. The medium telephoto lens of claim 1, wherein conditional expressions (2) and (3) below are satisfied:

$$0.80 < fi/f1a < 1.5 \quad (2), \text{and}$$

$$-0.4 < fi/f1b < 0.4 \quad (3), \text{where}$$

f1a: the combined focal length of the 1-1 lens through the 1-4 lens, and
f1b: the combined focal length of the 1-5 lens through the 1-7 lens.

7. The medium telephoto lens of claim 1, wherein conditional expressions (2-1) and (3-1) below are satisfied:

$$1.0 < fi/f1a < 1.3 \quad (2-1), \text{and}$$

$$-0.3 < fi/f1b < 0.3 \quad (3-1), \text{where}$$

f1a: the combined focal length of the 1-1 lens through the 1-4 lens, and
f1b: the combined focal length of the 1-5 lens through the 1-7 lens.

8. The medium telephoto lens of claim 1, wherein conditional expression (4) below is satisfied:

$$20.0 < vd6 - vd5 < 70.0 \quad (4), \text{where}$$

vd5: the Abbe number with respect to the d-line of the 1-5 lens, and
vd6: the Abbe number with respect to the d-line of the 1-6 lens.

9. The medium telephoto lens of claim 1, wherein conditional expression (4-1) below is satisfied:

$$25.0 < vd6 - vd5 < 60.0 \quad (4-1), \text{where}$$

vd5: the Abbe number with respect to the d-line of the 1-5 lens, and
vd6: the Abbe number with respect to the d-line of the 1-6 lens.

10. The medium telephoto lens of claim 1, wherein conditional expression (5) below is satisfied:

$$10 < vd3 - vd4 < 30 \quad (5), \text{where}$$

vd3: the Abbe number with respect to the d-line of the 1-3 lens, and
vd4: the Abbe number with respect to the d-line of the 1-4 lens.

11. The medium telephoto lens of claim 1, wherein conditional expression (5-1) below is satisfied:

$$16 < vd3 - vd4 < 30 \quad (5-1), \text{where}$$

vd3: the Abbe number with respect to the d-line of the 1-3 lens, and
vd4: the Abbe number with respect to the d-line of the 1-4 lens.

12. The medium telephoto lens of claim 1, wherein the second lens group substantially consists of a negative 2-1 lens with a concave surface toward the image side, a positive 2-2 lens with a convex surface toward the object side, and a positive 2-3 lens with a convex surface toward the image side, in this order from the object side.

13. The medium telephoto lens of claim 1, wherein the 1-7 lens is an aspheric surface lens with at least one aspheric surface.

14. An imaging device comprising the medium telephoto lens of claim 1, and an imaging element which outputs imaging signals according to an optical image formed by the medium telephoto lens.

* * * * *